(12) United States Patent
Tuccio

(10) Patent No.: US 7,395,062 B1
(45) Date of Patent: Jul. 1, 2008

(54) REMOTE SENSING SYSTEM

(75) Inventor: Frank Tuccio, Springfield, NJ (US)

(73) Assignee: Nielson Media Research, Inc. a Delaware corporation, New York, NY (US)

( * ) Notice: Subject to any disclaimer, the term of this patent is extended or adjusted under 35 U.S.C. 154(b) by 465 days.

(21) Appl. No.: 10/659,514

(22) Filed: Sep. 10, 2003

Related U.S. Application Data

(60) Provisional application No. 60/410,632, filed on Sep. 13, 2002.

(51) Int. Cl.
*H04Q 7/20* (2006.01)

(52) U.S. Cl. .................................. 455/426.1; 455/426.2

(58) Field of Classification Search ............. 455/426.1, 455/426.2, 555, 414.1, 410, 411, 412.1, 414.2, 455/415, 456.1, 456.6, 457, 423, 562, 561, 455/487; 713/200, 189; 725/16, 9; 370/252, 370/469, 389, 93.09, 232, 229, 300, 314, 370/352, 353, 356; 710/200, 188
See application file for complete search history.

(56) References Cited

U.S. PATENT DOCUMENTS

| | | | |
|---|---|---|---|
| 3,769,579 A * | 10/1973 | Harney | ........................ 725/16 |
| 4,626,904 A | 12/1986 | Lurie | |
| 4,677,466 A | 6/1987 | Lert, Jr. et al. | |
| 4,858,000 A | 8/1989 | Lu | |
| 4,930,011 A | 5/1990 | Kiewit | |
| 4,955,070 A | 9/1990 | Welsh et al. | |
| 5,031,228 A | 7/1991 | Lu | |
| 5,481,294 A | 1/1996 | Thomas et al. | |
| 5,550,928 A | 8/1996 | Lu et al. | |
| 5,579,124 A * | 11/1996 | Aijala et al. | ................... 386/96 |
| 6,272,176 B1 | 8/2001 | Srinivasan | |
| 6,968,564 B1 | 11/2005 | Srinivasan | |
| 7,006,555 B1 | 2/2006 | Srinivasan | |
| 2002/0090958 A1 * | 7/2002 | Ovard et al. | ................. 455/456 |
| 2003/0097586 A1 * | 5/2003 | Mok | ........................... 713/200 |
| 2004/0015400 A1 | 1/2004 | Whymark | |
| 2004/0024633 A1 | 2/2004 | Whymark | |
| 2004/0025177 A1 | 2/2004 | Whymark | |
| 2004/0117156 A1 * | 6/2004 | Newman et al. | ............ 702/187 |
| 2004/0117798 A1 * | 6/2004 | Newman et al. | ............ 719/310 |
| 2004/0132446 A1 * | 7/2004 | Seedman et al. | ......... 455/426.2 |
| 2004/0210922 A1 * | 10/2004 | Peiffer et al. | .................... 725/9 |
| 2005/0144632 A1 | 6/2005 | Mears et al. | |

* cited by examiner

*Primary Examiner*—Naghmeh Mehrpour
(74) *Attorney, Agent, or Firm*—Hanley, Flight & Zimmerman, LLC

(57) ABSTRACT

An apparatus for the remote monitoring of audio signals, such as radio broadcasts or the audio portion of television broadcasts, includes a portable transponder intended to be worn or carried by a potential audience member and a receiver. The receiver contains circuitry for perceiving audio present in a monitored region and identifying an audio signal of interest. It also contains circuitry for detecting the presence of the transponder in the monitored region and creating a record associating the dwell time of the transponder and thus the audience member in the monitored region with the audio signal.

13 Claims, 1 Drawing Sheet

REMOTE SENSING SYSTEM

The present invention relates to a remote sensing system, and in particular to a system for the remote monitoring of audio signals perceived by listeners in a monitored area. The present application claims the priority of provisional application 60/410,632, filed Sep. 13, 2002.

BACKGROUND OF THE INVENTION

The determination of the audience for electronic media broadcasts, such as radio or television, is of significant value and importance. The measured audience size reflects broadcast popularity, and creates a yardstick by which programming penetration into a market can be determined. Advertising rates associated with a broadcast are often a function of expected audience size. The more heavily watched or listened to a program, the greater the level of revenues that can be generated from advertising associated with the broadcast.

There have been numerous attempts to develop systems and methodologies for the determination of an actual audience, typically by attempting to monitor the activities of a particular audience segment and extrapolating that data to a more general audience.

At the most basic level, an audience member is directed to maintain a written log of his or her listening or viewing habits. The entry of such log data is often viewed as being a significant burden to the participant, and such logs are typically subject to large errors, inaccuracies and time gaps, resulting from both intentional and unintentional actions by the participant.

Monitoring systems which do not require active data recordation by the audience members are obviously preferable. Often, such monitoring systems are associated with a particularly adapted receiver apparatus, such as a television, located in the participant's home. Added circuitry within the receiver is capable of making a record of the particular broadcast to which the receiver is tuned, typically through reference to the audio portion of the broadcast. When an audience member wearing an associated monitoring device is in the presence of the receiver, the identity of the individual is transmitted to the receiver and is associated with the identity of the broadcast station to which the receiver is tuned, along with a record of the time interval in which the individual is present. Subsequently, the nature of the broadcast at the time of interest must be determined and correlated with the listener identification.

Other systems utilize portable receivers carried by the listener. In U.S. Pat. No. 4,626,904, for example, The audio portion of a television broadcast received by a television receiver is rebroadcast as a radio signal which is received by a portable receiver/headphone system worn by a viewer. Receipt of the signal causes an identification signal associated with the headphone system to be transmitted to a monitor unit. The monitor records the identity of the headphone, the duration of headphone activation, and with the channel to which the television is tuned.

Other portable receiver systems, as exemplified by the systems in U.S. Pat. Nos. 4,677,466 and 4,955,070, among others, provide for processing of the received signal to determine its identity, and create a time stamped log of the broadcast received. The broadcast can be identified in various manners, including by comparing the broadcast to reference signals or by decoding identification information present in the signal. The processed data retained by the receiver may be subsequently downloaded and transmitted to a remote facility.

While systems based upon a portable receiver and processor worn by the audience member are capable of providing a fairly accurate log of the signal to which the audience member is exposed, they are subject to significant limitations, in that only a limited number of broadcast signals or stations can be analyzed. Each of the receivers must be programmed with the necessary comparison data for a particular set of stations. This limits the universality of such a system. In addition, the computing power needed to do such analyses, particularly on a near real-time basis, severely limits the portability of the units as well as creating significant power requirements.

It is accordingly a purpose of the present invention to provide a remote sensing system capable of processing and evaluating broadcast audio signals perceived by an audience member.

A further purpose of the present invention is to provide such a remote sensing system in which a device carried by audience member is small, inconspicuous, and is of a universal character, capable of performing in a variety of locales.

Still a further purpose of the present invention is to provide a remote sensing system in which the processing of data is performed by a master unit, such that a plurality of carried devices can be associated therewith.

BRIEF DESCRIPTION OF THE INVENTION

In accordance with the forgoing and other objects and purposes, a remote sensing system of the present invention comprises one or more transponder units, each of which is carried by a participating audience member. A fixed station unit is located in a premises or area sought to be monitored, such as a room, and includes a microphone-driven audio circuit which detects the audio present in the monitored area, which audio may include the audio from a received radio or television broadcast being heard by the area's occupants. The audio circuit includes circuitry capable of determining the identity of received broadcast audio segments and generating a record setting forth the time interval over which the identified audio was received.

The fixed station also includes means for determining the identity of a transponder within the monitored area. When a transponder is within the reception radius of the fixed station, the fixed station recognizes the identity of the transponder and generates a record associating the transponder's (and the corresponding audience member carrying the transponder) presence with the received audio for so long as presence of the transponder is acknowledged. When multiple transponders are recognized by the fixed station, associated multiple records are created. Thus, a complete record of the appearance of all audience members in the monitored premises, and their exposure to the audio content therein, is obtained. The data may be forwarded to a central reception area or clearing house for further processing. As the transponder units do not process audio, they can be of simple construction and can be constructed to be more comfortable and non-intrusive to the wearer.

DESCRIPTION OF THE DRAWING

A fuller understanding of the present invention may be achieved upon consideration of the following description of a preferred, but nonetheless illustrative embodiment of the invention when considered in conjunction with the annexed drawings wherein.

DETAILED DESCRIPTION OF THE INVENTION

Figure 1:
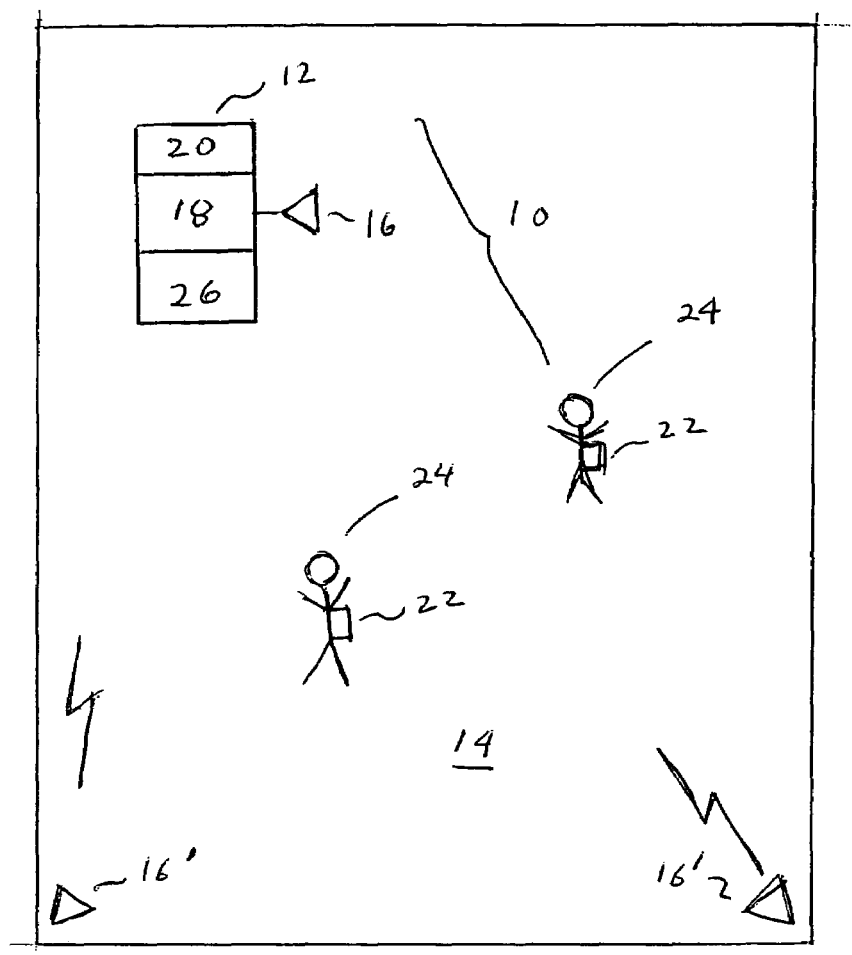
FIG. 1 is a diagrammatic representation of the invention in place in a monitored premises.

As shown in FIG. 1, the remote sensing system 10 of the present invention includes a fixed unit 12 to monitor the audio present in a particular area, such as a meeting room 14. The term "fixed" refers to the fact that the unit 12 is not carried by an individual to be monitored, but is substantially stationary in the premises to be monitored. It can be portable or movable in the sense that it can be positioned as appropriate in the premises or can be able to be moved to another premises or location, as desired. Typically, the monitored audio exists as the result of the reception and play of an audio broadcast, such as part of a television transmission received by a receiver in the monitored area, or as the audio of a radio broadcast received by a radio receiver in the area, either of which will contain audio desired to be tracked, as well as other ambient sounds, including conversations, random noise, and the like. The fixed unit includes processing circuitry 18 that analyzes the audio received by microphone 16, and determines whether it includes an audio signal of interest, i.e., whether it includes audio corresponding to a broadcasts the presence of which is to be monitored. A microprocessor 20 may control the processing and analysis circuitry, which may analyze the broadcast for encoded identification data, compare the audio to set parameters, or otherwise determine the identity of the broadcast, in a manner known in the art. If the processing circuitry identifies the audio as of interest, it extracts the identifying indicia or otherwise identifies the broadcast and creates a reception record. While the microphone 16 may be an integral part of the fixed unit 12, other or additional microphones 16' may be placed at other locations within the monitored area to further insure that all audio present in the monitored area is perceived and processed by the fixed unit. Alternatively, the type and positioning of the microphones may be such that only particular portions of a larger area are monitored, or that the sensitivity of the microphones to audio in different parts of the monitored area differ. Both omni and unidirectional microphones, for example, may be employed. In addition, either microphones or processing circuitry having specific response characteristics may be employed to tailor the audio reception characteristics as may be appropriate. The remote microphones 16' may be hard wired or otherwise coupled to the processing circuitry.

The reception record generated by the fixed unit may be continuous, representing a complete and continuous record of identified audio content, irrespective of whether a transponder signal is also received. Alternatively, the fixed unit may include circuitry to activate the processing system only during such times as the presence of a transponder 22 is sensed, corresponding to the presence in the monitored premises of a known audience member 24.

Each of the transponders 22 is a portable unit capable of being worn or carried by an audience member 24. The transponder may transmit a relatively short-range radio signal on a continuous or quasi-continuous basis. The radio signal comprises an identifier identifying the transponder and thus the identity of the individual audience member with which it is associated. Preferably, the identification signal is broadcast on a periodic, rather than continuous, basis to conserve battery power. Broadcast timing may be on a pseudo-random basis, or may be spread across a range of frequencies, as known in the art, to minimize the risk of signal overlap and collision when a plurality of transponders are in the same locale. The transponder may also be activated by polling signals sent by the fixed unit. In such a case, it may be possible for the transponder to be powered by the received polling signal and thus be battery free.

One or more radio receivers 26 in fixed unit 12 receive the transponder identification signals and create a record of their identities. A presence record, which identifies the transponder and its residence time in the monitored area, is created for each transponder identified, which presence record can be correlated with the record of identified audio content for the corresponding time interval. Since audio processing is performed only at the fixed location, rather than by each of the transponder units, the transponder units can be of minimal size, and may be incorporated into other items to be carried by the audience members, such as eyeglasses, a pen or pencil, or the like.

Since the transponders only emit an identifying signal, they can be of a universal nature, capable of interacting with a plurality of fixed units. Thus, the presence of a particular audience member can be monitored as he or she travels between a plurality of monitored areas, without concern as to their locations, so long as the fixed units in the monitored areas are capable of receiving the transponder's broadcast.

Further, since audio signal processing is performed by the fixed unit, the necessary processing power to perform real-time analysis of the audio signals can be provided without size or power restraints that may be associated with portable or miniaturized units. A fixed unit can be located wherever desired to create a monitored area, and its reception area can be tailored to the requirements of the particular location and data collection needs. Indeed, the fixed unit need not be physically present in the monitored area; only the microphones 18 need be present as their range and sensivity define the metes and bounds of the monitored premises.

The data records generated by the fixed unit may be maintained on an appropriate storage device in the fixed unit. The data may be transmitted or downloaded as appropriate by means known in the art, such as through a telephone line connection, to a central processing facility for ultimate analysis.

I claim:

1. An apparatus for the remote monitoring of audio signals, comprising:
    a portable transponder to transmit an identification signal, the portable transponder powered by a polling signal; and
    a fixed receiver for detecting an audio signal present in a monitored region and determining an identity of the audio signal detected, for transmitting the polling signal to the portable transponder, for determining an identity of the portable transponder from the identification signal when the transponder is present in the monitored region, and for associating the identity of the transponder with the identity of the audio signal detected over a dwell time of the transponder in the monitored region.

2. The apparatus of claim 1, wherein the transponder is a transponder carried by an individual.

3. The apparatus of claim 1, wherein the fixed receiver includes a microphone circuit for detecting the audio signal.

4. The apparatus of claim 1, wherein the fixed receiver includes means for storing the association between the identities of the transponder and audio signal.

5. The apparatus of claim 1, wherein the audio signal is the audio portion of a received radio or television broadcast.

6. A method for the remote monitoring of audio signals, comprising:
    monitoring a designated region for the presence of an audio signal;
    processing the audio signal to determine its identity;
    monitoring the region for the presence of a transponder, the transponder powered by a polling signal;
    receiving an identification signal from the transponder, the transponder transmitting the identification signal in response to receiving the polling signal;
    identifying the transponder from the identification signal and its dwell time within the region and the identity of the audio signal, and the dwell time in the region; and
    generating a record correlating the transponder, its dwell time, and the identity of the audio signal.

7. An apparatus for the remote monitoring of audio signals, comprising:

a portable transponder to transmit an identification signal, the portable transponder powered by a polling signal;

means for detecting an audio signal present in a monitored region and determining an identity of the audio signal detected;

means for transmitting the polling signal to the portable transponder;

means for determining an identity of the portable transponder from the identification signal when the transponder is present in the monitored region; and means for generating a record associating the identity of the transponder with the identity of the audio signal detected over a dwell time of the transponder in the monitored region.

8. The apparatus of claim 7, wherein at least the means for detecting an audio signal and determining an identity thereof is at a fixed location.

9. The apparatus of claim 8, wherein the transponder is a transponder carried by an individual.

10. The apparatus of claim 8, wherein the means for detecting an audio signal comprises a microphone.

11. The apparatus of claim 8, further including means for storing the record at the fixed location.

12. The apparatus of claim 7, wherein the audio signals are the audio portions of received radio or television broadcasts.

13. The apparatus of claim 7, further comprising means associated with the means for determining the identity of the transponder for causing the transponder to emit an identification signal only when in the monitored region.

* * * * *

UNITED STATES PATENT AND TRADEMARK OFFICE
CERTIFICATE OF CORRECTION

| | | |
|---|---|---|
| PATENT NO. | : 7,395,062 B1 | Page 1 of 1 |
| APPLICATION NO. | : 10/659514 | |
| DATED | : July 1, 2008 | |
| INVENTOR(S) | : Frank Tuccio | |

It is certified that error appears in the above-identified patent and that said Letters Patent is hereby corrected as shown below:

Title page, item [73]

replace "Nielson Media Research, Inc. a Delaware corporation"

with -- Nielsen Media Research, Inc. a Delaware corporation --

Signed and Sealed this
First Day of January, 2013

David J. Kappos
*Director of the United States Patent and Trademark Office*